United States Patent
Bach et al.

(10) Patent No.: US 9,139,172 B2
(45) Date of Patent: Sep. 22, 2015

(54) METHOD AND DEVICE FOR SPEED REGULATION WHEN TRAVELLING ON AN INCLINE

(75) Inventors: Thomas Bach, Wolken (DE); Michael Bleser, Plaidt (DE); Elmar Hoffmann, Meinborn (DE); Stefan Wöll, Weyer (DE); Harald Thelen, Oberfell (DE)

(73) Assignee: Lucas Automotive GmbH, Koblenz (DE)

( * ) Notice: Subject to any disclaimer, the term of this patent is extended or adjusted under 35 U.S.C. 154(b) by 1273 days.

(21) Appl. No.: 12/528,714

(22) PCT Filed: Feb. 6, 2008

(86) PCT No.: PCT/EP2008/000912
§ 371 (c)(1),
(2), (4) Date: Sep. 24, 2010

(87) PCT Pub. No.: WO2008/104268
PCT Pub. Date: Sep. 4, 2008

(65) Prior Publication Data
US 2011/0010065 A1    Jan. 13, 2011

(30) Foreign Application Priority Data

Feb. 28, 2007 (DE) .......................... 10 2007 009 860

(51) Int. Cl.
G06F 7/70 (2006.01)
G06F 19/00 (2011.01)
G06G 7/00 (2006.01)
G06G 7/76 (2006.01)
B60T 7/12 (2006.01)
B60K 31/04 (2006.01)
B60W 30/14 (2006.01)

(52) U.S. Cl.
CPC . B60T 7/12 (2013.01); B60K 31/04 (2013.01); B60T 2201/04 (2013.01); B60W 30/146 (2013.01); B60W 2550/142 (2013.01); B60W 2720/30 (2013.01)

(58) Field of Classification Search
CPC ................................. B60T 7/12; B60K 31/04
USPC ................................................... 701/70
See application file for complete search history.

(56) References Cited

U.S. PATENT DOCUMENTS

| 5,957,552 A * | 9/1999 | Claussen et al. .............. 303/192 |
| 6,915,201 B1 | 7/2005 | Ott et al. |
| 2005/0096183 A1 | 5/2005 | Watanabe et al. |

FOREIGN PATENT DOCUMENTS

| DE | 19637297 B4 | 3/1998 |
| DE | 19925368 A1 | 12/2000 |

OTHER PUBLICATIONS

International Search Report to PCT/EP2008/000912 dated May 14, 2008.

* cited by examiner

*Primary Examiner* — Maceeh Anwari
(74) *Attorney, Agent, or Firm* — MacMillan, Sobanski & Todd, LLC

(57) ABSTRACT

A method and an apparatus for controlling the speed of a motor vehicle in particular during a hill ascent are described. In a PID controller acting upon the brake system of the motor vehicle the change of the vehicle inclination is fed into the I branch of the controller, thereby providing an adaptive speed control.

11 Claims, 4 Drawing Sheets

METHOD AND DEVICE FOR SPEED REGULATION WHEN TRAVELLING ON AN INCLINE

CROSS-REFERENCE TO RELATED APPLICATIONS

This application is a national stage of International Application No. PCT/EP2008/000912 filed Feb. 6, 2008, the disclosures of which are incorporated herein by reference, and which claimed priority to German Patent Application No. 10 2007 009 860.1 filed Feb. 28, 2007, the disclosures of which are incorporated herein by reference.

BACKGROUND OF THE INVENTION

The invention relates to a method and an apparatus for controlling speed. More precisely, the invention relates to speed control of a motor vehicle during a hill descent.

Motor vehicles negotiating hill descents have to be braked during the descent in accordance with the speed to be observed and the steepness of the downhill gradient. Within certain limits it is mostly possible, by selecting a suitable gear speed, to utilize the braking torque of the drive motor to reduce the vehicle speed during a hill descent.

By means of a drive motor operating in overrunning mode, however, the variation of the speed during a descent may be achieved only imprecisely and to a slight extent. In order for example to slightly increase the descent speed, the driver may accelerate a little and drive the engine in part-load operation. However, this entails an unnecessary consumption of fuel as well as an unavoidable acoustic environmental pollution by the engine. In terms of engine wear too, it is not ideal to negotiate longer hill descents in part-load operation. If, conversely, the descent speed is to be slightly reduced, then the driver will actuate the service brake for this purpose.

Longer hill descents with an actuated service brake are for example customary in off-road vehicles that travel down steep inclines. If the steepness of the route changes, then the driver is requested to correct his brake actuation accordingly.

Devices, which on a downhill run keep the vehicle at a constant speed preset by the driver through an automatic actuation of the brakes, are already in use. Such control devices, which influence a vehicle service brake in a way that enables a hill descent at a constant speed, are known by the name of HDC (hill descent control) devices. HDC devices frequently make use of components that are already fitted as standard in the motor vehicle within the framework of for example antilock braking systems (ABS) or traction control systems (ASR). Such components include control units, wheel rotational speed sensors, electrically driven pumps and clutches, magnetic control valves, diverse sensors as well as further units and devices.

In many HDC devices, only the difference between a setpoint speed and an actual speed is determined, from which any required brake actuation is then derived. Other HDC devices determine a value for the road inclination and from this determine an actuating signal for the service brake. From WO 01/14185 A1 it is known for example to compensate the influence of the downhill road gradient in travelling direction upon the vehicle speed independently of "conventional" speed control in that the brake pressure determined by the speed control is increased by a compensating brake pressure, the amount of which is determined from the road inclination. The service brake is then acted upon by the sum of these two brake pressure components.

It has however been shown that such systems do not cope well with road sections of varying inclination. This manifests itself for example in control variations, unexpectedly strong exertions of influence on the service brake or a non-uniform vehicle speed in the transition between sections of differing inclination. Occasionally, it is also observed that the vehicle speed actually achieved by known HDC devices is not fully independent of the degree of the downhill gradient.

The underlying object of the invention is therefore to improve the control response and the operational reliability of the described speed control for motor vehicles.

BRIEF SUMMARY OF THE INVENTION

According to a first aspect, a method according to the invention for controlling an actual speed of a motor vehicle in travelling direction thereof (in forward direction or in reverse) during a hill descent comprises determining an actual speed signal, determining an inclination signal, determining a setpoint speed signal, determining a difference signal from the actual speed signal and the setpoint speed signal, determining an actuating signal from the difference signal, converting the actuating signal to at least one braking signal and supplying the at least one braking signal to a brake system of the motor vehicle, wherein the determination of the actuating signal from the difference signal is influenced by the inclination signal.

In this case, the inclination signal may indicate an absolute downhill gradient of the terrain. As an alternative to this, the inclination signal may indicate a time rate of change of the inclination. In this way, instead of the absolute downhill gradient of the terrain, a transition to a road section of a different downhill gradient may be signalled. The inclination signal may also signal other inclination-related parameters.

The determination of the actuating signal from the difference signal may comprise a proportional-integral-differential (PID) control operation. Such controllers are well known in the background art and have three parallel branches, the inputs of which each receive a difference signal of a controlled system, while their outputs are additively combined. In its general form, which is simultaneously covered by the invention, a PID control operation also includes all of the variations that arise by omitting one or two branches (PI, PD, P, I, D). The influencing of the control response by the inclination signal may concern in particular the integrative branch (I) of the PID controller.

The conversion of the actuating signal to a braking signal may comprise a conversion of a setpoint braking force derived from the actuating signal to a brake pressure associated with the setpoint braking force. During this process, an estimation of the ratio of the two variables, braking force and brake pressure, may be effected. Such an estimation is advantageous particularly if it is impossible for the relationship between setpoint braking force and brake pressure to be modelled precisely or precisely enough.

If the motor vehicle has a plurality of wheel brakes, then the actuating signal may be converted to at least one wheel-specific braking signal. Such an apportioning of the braking signals to the various wheel brakes may be subject to braking-force distribution mechanisms that allow a non-uniform distribution of the braking force and/or the brake pressure. If the actuating signal is converted to two or more wheel-specific braking signals, then the sum of the wheel-specific brake pressures according to the wheel-specific braking signals may equal the total brake pressure requested by means of the actuating signal.

The conversion of the actuating signal to at least one braking signal may take into account further influences that influence the relationship between the setpoint braking force and a deceleration of the motor vehicle. In particular, the wheel-specific braking signal distribution may comprise functions of an antilock braking system (ABS) or of an electronic stability program (ESP).

According to a second aspect, the invention comprises a computer program product with program code means for implementing a method according to the invention when the computer program product is in operation at a processing module. In this case, the computer program product may be stored on a medium that is readable by the processing module. The processing module may be a control unit. The control unit may be connected to a bus system of the vehicle.

According to a third aspect, an apparatus according to the invention for controlling an actual speed of a motor vehicle in travelling direction thereof during a hill descent comprises a device for determining an actual speed signal, a device for determining an inclination signal, a device for determining a setpoint speed signal, a device for determining a difference signal from the actual speed signal and the setpoint speed signal, a device for determining an actuating signal from the difference signal and a device for determining at least one braking force signal from the actuating signal, wherein the device for determining the inclination signal is coupled in such a way to the device for determining the actuating signal that the determination of the actuating signal from the difference signal may be influenced by the inclination signal. In this case, the device for determining the inclination signal may determine a time rate of change of the inclination.

According to a further aspect, a system for braking a motor vehicle comprising a plurality of wheels, in particular during a hill descent, comprises a brake system, which may be coupled to the motor vehicle and acts upon at least one of the wheels thereof, as well as a speed control apparatus according to the invention.

Other advantages of this invention will become apparent to those skilled in the art from the following detailed description of the preferred embodiments, when read in light of the accompanying drawings.

DETAILED DESCRIPTION OF THE INVENTION

In this description, by inclination is meant in each case the inclination of a motor vehicle that causes an acceleration and/or deceleration of the motor vehicle in the direction of motion thereof. The inclination therefore denotes the uphill gradient or the downhill gradient in travelling direction. All of the speeds of a motor vehicle are accordingly to be understood in each case in the direction of motion thereof. In each case, the brake system is designed to exert an acceleration counter to the direction of motion of the vehicle.

Figure 1:
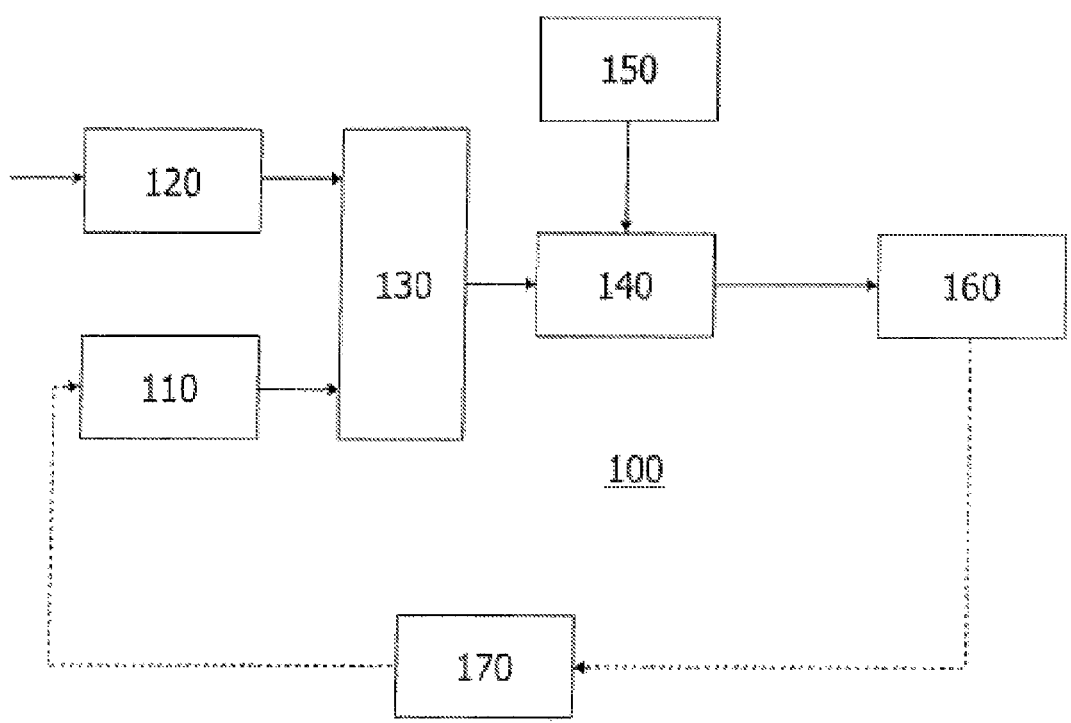
FIG. 1 shows an embodiment of an apparatus according to the invention for controlling the actual speed of a motor vehicle during a hill descent.

FIG. 1 shows an embodiment of an apparatus 100 according to the invention for controlling the speed of a motor vehicle during a hill descent.

A device 110 for determining an actual speed signal supplies a signal that is derived from the actual speed of the vehicle. This may be an analogue or digital signal that preferably bears a linear relationship to the vehicle speed. A conventional form of signal is a digital tacho signal.

A device 120 for determining a setpoint speed signal likewise supplies at its output a signal that represents a speed. The definition of the setpoint speed by means of the device 120 is effected preferably by the driver of the motor vehicle in that he uses an operator control element (not represented) of the device 120 to accept the presently driven speed as a setpoint speed or to raise or lower an adjusted setpoint speed.

The speed control apparatus 100 further comprises a device 130 for determining a difference signal from the actual speed signal and the setpoint speed signal. The transmission of the corresponding speed signals of the devices 110 and 120 to the device 130 for determining a difference signal may be effected using any desired technology adapted to the signal. For example, in the case of digital signals a CAN bus may be used. It is however also possible to use any other signal transmission protocols. An analogue transmission, for example by means of classic copper conductors, is equally possible. This applies analogously to all signal transmissions of the illustrated embodiments.

The device 130 for determining the difference signal forms the difference from the determined actual speed and the determined setpoint speed. A positive difference therefore indicates that the vehicle needs to be braked in order to reach the setpoint speed, while a negative difference indicates that the vehicle is already slower than the setpoint speed (and optionally needs to be accelerated independently of the driver).

The difference signal determined by the device 130 is relayed to a control device 140 for determining an actuating signal. The device 140 provides the real control function of this embodiment. In principle, the device 140 may be any desired type of controller, for example a linear controller, such as a PID controller, or a non-linear controller such as for example an adaptive controller or a non-continuous controller. The control operation is preferably effected by means of processing digital signals. For this purpose, it may first be necessary to convert the determined input signals from analogue to digital format. It is however also possible to use an analogue computer or mechanical components for the control operation.

A device 150 for determining the inclination determines a signal that bears a known relationship to the angle of inclination and preferably to the change of the angle of inclination of the vehicle. The representation and transmission of this signal is effected in accordance with the previously described representation and transmission of the signals of the components 110 and 120. The inclination signal influences the control device 140 and enables it simultaneously to include the inclination information in the speed control of the motor vehicle.

The control device 140 determines from the difference signal and the inclination signal an actuating signal that is suitable for influencing a vehicle deceleration in such a way that the actual speed corresponds as well as possible to the setpoint speed. The actuating signal is then made available to a conversion device 160, which determines from the actuating signal one or more braking signals that control an actual actuation of one or more brakes of a motor vehicle 170. The vehicle 170 comprises a brake system (not represented) that acts upon a plurality of wheels (not represented) of the vehicle. The influence of the braking signal of the conversion device 160 on the vehicle 170 therefore consists of an activation of the brakes and hence a deceleration of the vehicle 170. The varied speed of the vehicle 170 then influences the actual speed determined by the device 110.

In this way the control loop is closed, and the control operation may be carried out continuously. A device for activating and/or deactivating the speed control may be additionally implemented but is not represented in this embodiment. A deactivation of the control might be implemented at various components, for example by deactivating the control device 140 or by influencing the conversion device 160.

Figure 2:
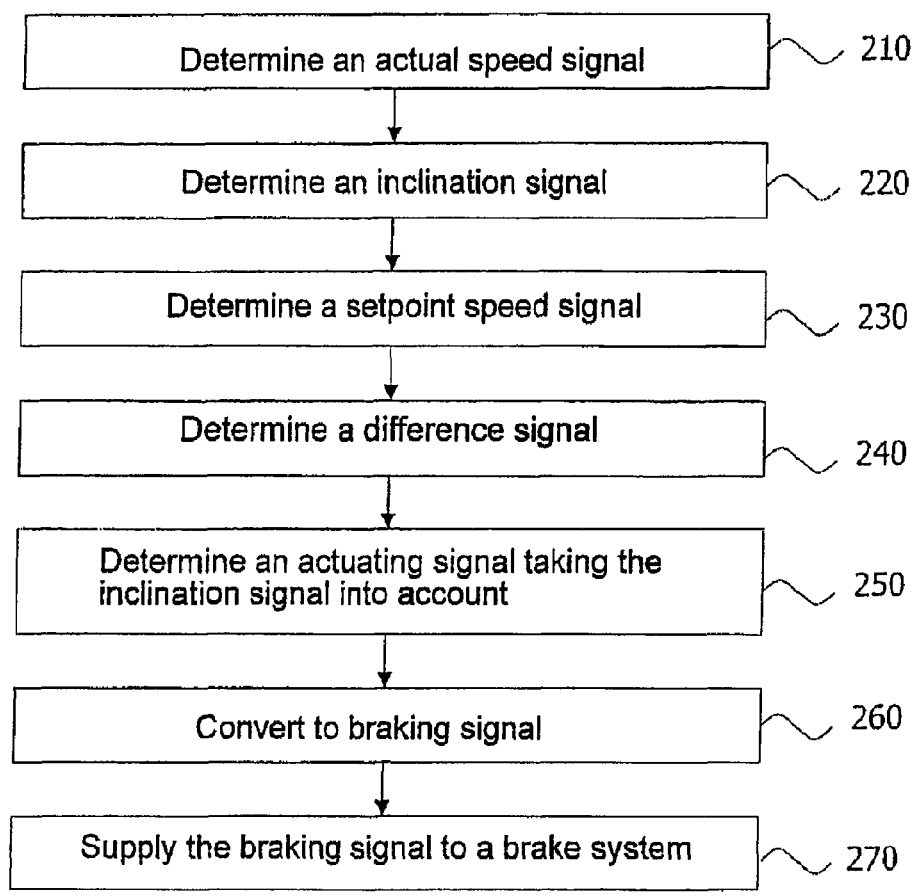
FIG. 2 shows in a flowchart an embodiment of a method according to the invention for controlling the actual speed of a motor vehicle.

There now follows a description with reference to FIG. 2 of a flowchart 200 that represents an embodiment of the control method according to the invention. The individual method steps may be carried out by a control apparatus 100 of the type illustrated in FIG. 1 or by a control apparatus configured in some other way. The method may be used both during forward travel and during reversing of a motor vehicle.

At the start of the method, in step 210, an actual speed signal representing the instantaneous speed of motion of the motor vehicle is determined. In the next step 220 an inclination signal representing the inclination of the motor vehicle in the direction of travel is determined. Then, in step 230 a setpoint speed signal is determined. This signal represents the speed that the motor vehicle is to achieve. In the present case, the order of the steps 210, 220 and 230 has been selected arbitrarily. In particular, the steps 210 and 230 may be executed in any order and also in parallel; it is merely necessary for both signals to be valid before step 240 is executed. Step 220 has to supply a valid signal before this signal can be processed in step 250 (see below).

In step 240 a difference signal is formed from the actual speed signal of step 210 and the setpoint speed signal of step 230. So that the difference signal is positive if the vehicle has a higher actual speed than its setpoint speed, in step 240 the setpoint speed signal of step 230 is subtracted from the actual speed signal of step 210. It is possible when forming the difference to transpose minuend and subtrahend, with the result that the resulting difference signal receives a different sign. The following steps would then have to take this correspondingly into account.

In step 250 an actuating signal is determined from the difference signal and the inclination signal (steps 220 and 240). The actuating signal represents the influencing variable on the speed of the vehicle that the mechanism underlying the method supplies in order to carry out a speed control that is as efficient as possible. In a preferred manner, the actuating signal is directly proportional to a deceleration of the motor vehicle.

The inclination signal determined in step 220 is used to influence the determination of the actuating signal from the difference signal. The instant of determination of the inclination signal is preferably as close as possible to the instant of determination of the actuating signal in order to prevent distortions caused by processing values that are no longer actual. For this reason, it would also be possible to execute step 220 at any other point than the one represented and in particular even in parallel with other steps, provided it is ensured that the value determined in step 220 exists before it is needed for execution of the step 250.

The conversion of the actuating signal determined in step 250 to a braking signal is effected in step 260. During this process, a large number of further factors of influence may be simultaneously taken into account. For example, a steering angle or a selected gear speed may also be included in the processing. Equally, information from an antilock brake system or the torque of the power train may be incorporated into the processing. The braking signal may contain wheel-specific braking information for a plurality of wheel brakes. In this case, step 260 may contain the wheel-specific distribution of the braking signals among the brakes. In a final step 270 the braking signals thus determined are supplied to a brake system of the motor vehicle.

The illustrated flowchart shows a snapshot of a cyclical and/or continuous process. This continuity and the effect of a brake activation upon a speed subsequently determined in step 210 are not included in this flowchart but are implicitly covered by the method.

Figure 3:
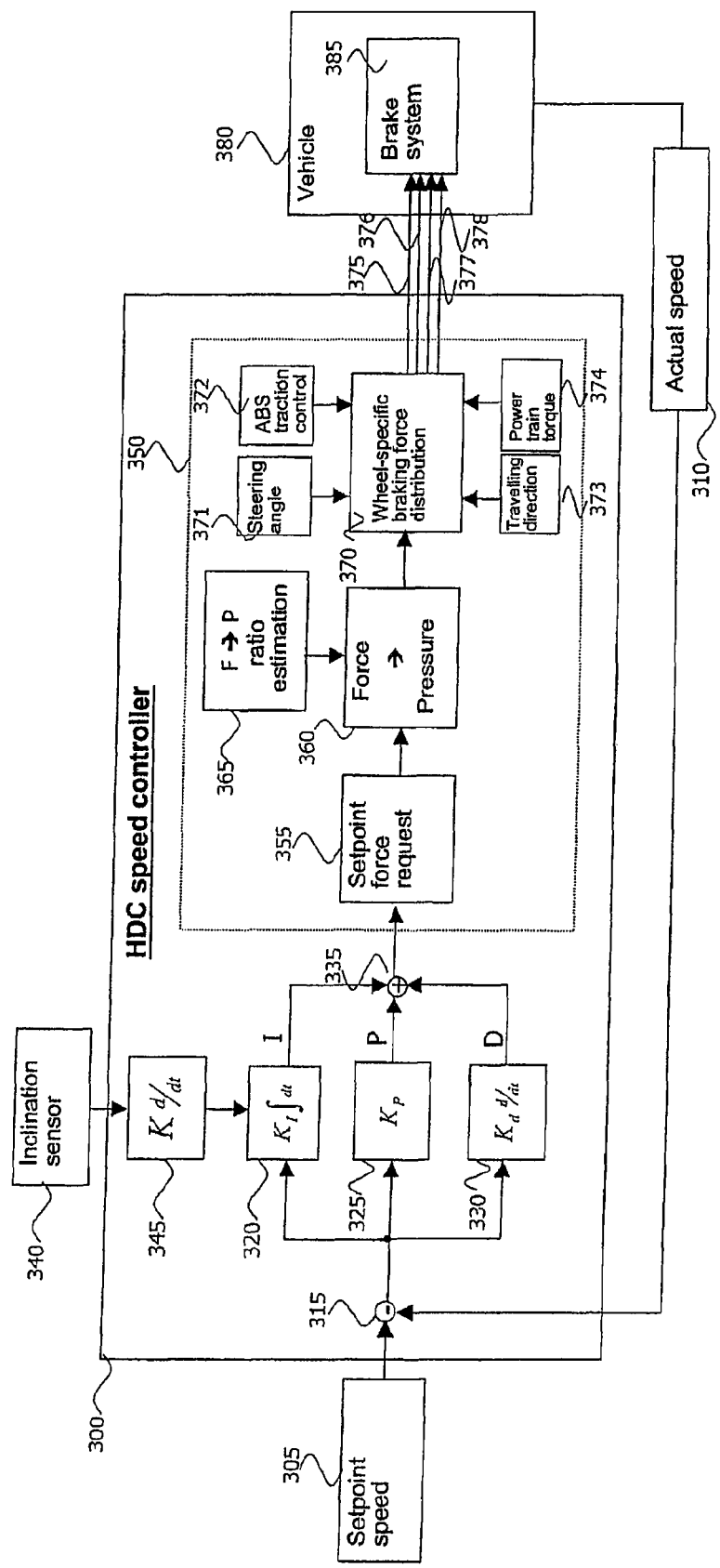
FIG. 3 shows a further embodiment of an apparatus according to the invention for controlling the actual speed of a motor vehicle.

FIG. 3 shows a further embodiment of an apparatus according to the invention for controlling the speed of a motor vehicle. The actual control elements (with the exception of the sensors) are situated in the box provided with the reference character 300.

An element 305 determines a setpoint speed of the motor vehicle. Usually this speed is defined by the driver of the vehicle; it is however also possible to carry out at this point an automatic or semi-automatic acceptance of a setpoint speed signal provided by another information source (for example a memory).

In element 310 the actual speed of the vehicle is determined. In the simplest case, this determination might comprise the tapping of a supplied tacho signal; a more complex system will preferably accept a more precise speed signal, for example from an ABS control unit. In element 315 the difference of the actual speed and the setpoint speed of the vehicle is determined. In order to be able to carry out this step, it may be necessary for the speed information supplied by the elements 305 and 310 to be appropriately converted or normalized (not illustrated). A normalization may comprise the compensation of an offset error or multiplication by a constant factor. Optionally, the normalization may also ensure a matching of the respective relationship between a signal variable and a speed. In this way, the signals supplied by the components 305 and 310 are, if need be, brought into the same format before being processed in element 315.

Three elements 320, 325 and 330 represent the three branches of a so-called PID controller. The integrative or I branch is represented by element 320, while element 325 represents the proportional or P branch and element 330 the differential or D branch of the controller. In principle, any one (or any two) of the three branches may be omitted. This may be modelled by a multiplication of the output of the corresponding branch by the constant factor 0. A constant factor is at any rate used in each of the three branches to adapt the properties of the controller to the individual problem definition. In each of the elements 320, 325 and 330 such a factor is characterized by the letter K. The three branches described carry out different component determinations, which are used for control and the results of which are added in element 335.

In principle, the PID controller shown in FIG. 3 may also be replaced by a different type of controller, as known in the background art. Besides non-linear controllers, map tables or alternatively static linear feedback loops may also be considered for this purpose. Non-continuous controllers are also usable. The influence of the inclination signal on the control operation then has to be correspondingly adapted to the controller. The preferred embodiment according to FIG. 3 however provides a PID controller and deals with an influencing of the I branch 320 thereof in more detail below.

An element 340 in the form of an inclination sensor detects the vehicle inclination. Suitable sensors are well known in the background art and may be implemented for example by gyroscopes or pendulum sensors. The position of the inclination sensor 340 in the vehicle is meaningfully so selected that as few disturbances, such as vibrations or rocking motions, as possible distort the measurement result. The aim of the measuring operation is to determine in as good an approximation as possible the inclination of the ground situated underneath the vehicle at the time of measurement.

An element 345 connected downstream of the inclination sensor 340 determines a change of the inclination signal over time. In the illustrated embodiment, this is effected by numerical differentiation after the measured inclination signal has been appropriately normalized and digitized. An analogue or mechanical determination of the change is equally possible. Where necessary, an adaptation of the output variable is carried out to allow further processing to occur.

The inclination change signal determined by means of the element 345 influences the integrative or I branch 320 of the PID controller. As the I branch of a PID controller, given a constant input signal, produces a continuously rising output signal, this branch of the controller is particularly suitable for simultaneous processing of the information of an inclination change. By injecting the inclination change signal into the I branch of the PID controller it is possible during speed control to take a changing load state of the motor vehicle caused by a change in the slope of the terrain into account at the very moment that the change of slope occurs. Furthermore, wheel-specific brake pressures in the event of overcompensation may be fully corrected by means of the controller. The injection of the signal supplied by the element 345 may be effected for example in an additive, multiplicative, generally polynominal or also exponential manner.

The elements in the box denoted by the reference character 350 have the task of processing the actuating signal supplied by the element 335 in such a way that it is suitable for exerting an influence on a vehicle brake system and hence on the actual speed 310. In the illustrated embodiment, first an element 355 determines from the received signal a setpoint force request, which represents the force that is to be exerted on the vehicle counter to the direction of travel. This determination may generally be of any desired type, for example a conversion function may be implemented or a conversion table. An element 360 converts the determined force to a pressure that may be processed by a hydraulic brake system. This conversion is effected by way of an estimation of the ratio between the force requested by the element 355 and the hydraulic brake pressure needed to achieve this force. Such an estimation may be determined for example by way of a table or a dynamic determination of the ratio on the basis of ratios determined in the past.

The pressure signal determined by element 360 is relayed to an element 370, which carries out a wheel-specific brake pressure- and/or braking force distribution. In the illustrated embodiment, the wheel-specific braking force distribution 370 uses the influencing variables of the steering angle 371, the ABS traction control 372, the direction of travel 373 and the torque in the power train 374. While it is not necessary to include all four influences 371 to 374 in the wheel-specific braking force distribution 370, there are in addition further vehicle components, the supplied information of which may be simultaneously processed by the unit 370. This includes for example information about the ground underneath the vehicle, wear information of a brake, an adjustment of desired dynamics of vehicular operation and further information existing in the vehicle.

In the illustrated embodiment, the wheel-specific braking force distribution 370 produces four wheel-specific braking signals 375, 376, 377, 378 for each wheel brake of the vehicle 380. For achieving the advantages of the apparatus according to the invention it is however generally sufficient to provide a single braking signal.

The vehicle 380 has a brake system 385, which comprises four wheel-specific brakes (not represented) that are driven by the braking force signals 375 to 378. The brake system is preferably a hydraulic brake system 385, wherein the brake pressure of each of the four wheel brakes may be individually electrically influenced. It is however also possible to adapt the method to other braking technologies. If for example the brake system 385 operates purely electrically (brake-by-wire), then the braking signals 375 to 378 will have a corresponding format.

The vehicle 380, the speed of which may vary in the course of the control operation, exerts an influence on the determination of the actual speed by element 310. In this way, the control loop is closed and a complete control operation is implemented.

Figure 4:
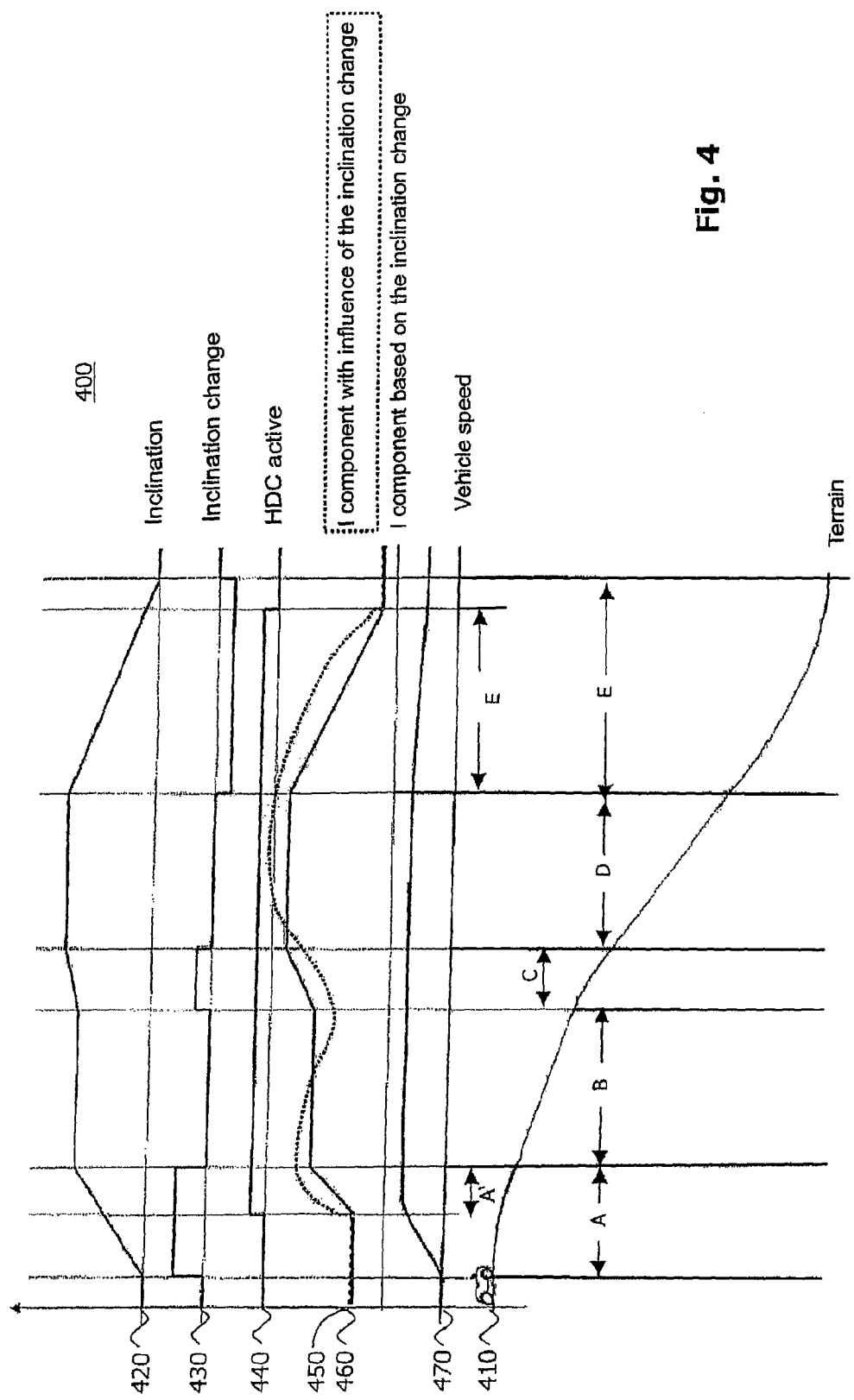
FIG. 4 shows an example of a downhill road section and various parameter changes that arise during negotiation of the section by a motor vehicle that is speed-controlled in accordance with the invention.

The graphs 400 in FIG. 4 illustrate various parameters that arise during a hill descent by a motor vehicle that is speed-controlled in accordance with the invention.

A curve 410 shows a road section with a downward gradient in side view. In horizontal direction the terrain is subdivided into five portions A to E. The same portions are used below to interpret the signals 420 to 470, such as arise for example in the apparatus 300 according to FIG. 3. The horizontal axis of all of the curves 410 to 470 denotes the location represented in curve 410.

The inclination of the represented downward gradient 410 may be seen in curve 420 (expressed for example in percent or degrees of inclination). While in portion A the downward gradient of the road section increases, in portion B it remains constant. In portion C the downward gradient becomes linear once more, before remaining constant in portion D. In portion E the downward gradient decreases linearly until at the end of portion E the road section is horizontal (and/or its inclination is 0).

A third curve 430 shows the time rate of change of the inclination 420. It is evident that the change of inclination in portions A and C is positive, while it has the value 0 in portions B and D and is negative in portion E. It is also evident that the value of the change of inclination in portion A is greater than the value in portion C. Portion E, in terms of value, has approximately the same inclination change as portion C.

A further curve 440 denotes a temporary activation of the HDC speed control system according to the invention. For demonstration purposes, the activation of the control system does not occur until roughly in the middle of portion A and ends shortly before the end of portion E. The control system is therefore active during the portions A', B, C, D and E'. This corresponds to the typical activation on the part of the driver, who resorts to the HDC system only after embarking on a hill descent and switches the HDC system back off shortly before the end of the downhill section.

A dotted curve 450 denotes the I signal component of an HDC speed controller according to the invention that is equipped with a PID control mechanism. This signal already contains the influence of the inclination change. The continuous curve 460 denotes the part of the I component that, because of the inclination change, exerts an influence on the control operation. The difference between the curves 450 and 460 is therefore the contribution according to the invention of the inclination change signal to the PID control operation. The manner in which the continuous curve 460 of the I component because of the inclination change corresponds in shape to the curve 420 of the inclination may be seen clearly.

The compensation of the inclination change is therefore effected immediately the inclination change occurs, and not after the change of inclination has led to a change of the vehicle speed that subsequently has to be corrected.

A further curve 470 represents the vehicle speed. It may clearly be seen that in the regions A', B, C and D no variation of the vehicle speed occurs. The slight drop in the vehicle speed in portion E' lies within the tolerable range and is evidence of only slight system deviations. Upon disconnection of the HDC system at the end of portion E', the vehicle is situated on an (almost) horizontal road surface, for which reason there is hardly any further variation in the speed.

From the described embodiments it becomes immediately clear to the person skilled in the art that the HDC speed control system is equally suitable for controlling and in particular for controlled maintaining of a vehicle speed on a downward gradient.

As emerges from the description of the embodiments, the HDC speed control system is improved by considering the inclination and/or the downgrade force and/or downgrade acceleration derivable therefrom as an influencing variable on a control loop. By virtue of this measure the disturbing influence on the control operation may be minimized or even eliminated. As a result, the control loop may therefore be regarded as a control system for a flat section, wherein the influencing variable injection according to the invention brings about a simultaneous adaptive behaviour of the controller upon a variation of the downgrade force and/or downgrade acceleration. These variables and their trend may be determined from the inclination signal by means of a model.

In summary, the influencing variable injection explained in the embodiments prevents too slow a correction behaviour of the controller and improves the transient response in the event of a change of gradient (change of downward- or upward gradient). An advantageous secondary effect is the achievement of a simplified controller design with a simplified control algorithm. There is moreover a possibility of wheel-specific braking force distribution based on further influencing variables. These further influencing variables include superimposed signals of an ABS traction controller, steering-angle-dependent braking force distribution, travelling-direction-dependent braking force distribution as well as a braking force distribution based on a power train torque and/or—overrun torque.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A method of controlling an actual speed of a motor vehicle in a travelling direction thereof during a hill descent, comprising the following steps:
   (a) determining an actual speed signal;
   (b) determining an inclination signal that represents a rate of change of an inclination as a function of time of a motor vehicle in a travelling direction thereof during a hill descent;
   (c) determining a setpoint speed signal;
   (d) determining a difference signal from the actual speed signal and the setpoint speed signal;
   (e) determining an actuating signal from the difference signal and the inclination signal;
   (f) converting the actuating signal to at least one braking signal; and
   (g) supplying the at least one braking signal to a brake system of the motor vehicle.

2. The method according to claim 1, wherein the determination of the actuating signal from the difference signal in step (e) comprises a proportional-integral-differential (PID) control operation.

3. The method according to claim 2, wherein the proportional-integral-differential control operation in step (e) is accomplished by a PID controller and further wherein the integrative branch of the PID controller is influenced by the inclination signal.

4. The method according to claim 1, wherein the conversion of the actuating signal to at least one braking signal in step (f) comprises a conversion of a setpoint braking force derived from the actuating signal to a brake pressure associated with the setpoint braking force.

5. The method according to claim 3, wherein the motor vehicle has a plurality of wheel brakes and that the actuating signal is converted in step (f) to at least one wheel-specific braking signal.

6. The method according to claim 5, wherein the conversion of the actuating signal to at least one braking signal takes into account further influences that influence the relationship between the setpoint braking force and a deceleration of the motor vehicle.

7. The method according to claim 5, wherein the wheel-specific braking signal distribution takes into account functions of an antilock braking system (ABS) or of an electronic stability program (ESP).

8. The method according to claim 1 further including a non-transitory computer readable storage medium comprising a computer readable program code for implementing the method when the non-transitory computer readable storage medium is in operation at a processing module.

9. The method according to claim 8, wherein the non-transitory computer readable storage medium is readable by the processing module.

10. An apparatus for controlling an actual speed of a motor vehicle in a travelling direction thereof during a hill descent, comprising:
    a device for determining an actual speed signal;
    a device for determining an inclination signal that represents a time rate of change of an inclination as a function of time of a motor vehicle in a travelling direction thereof during a hill descent;
    a device for determining a setpoint speed signal;
    a device for determining a difference signal from the actual speed signal and the setpoint speed signal;
    a device for determining an actuating signal from the difference signal, which device is coupled in such a way to the device for determining the inclination signal that the determination of the actuating signal from the difference signal may be influenced by the inclination signal; and
    a device for determining at least one braking signal from the actuating signal.

11. A system for braking a motor vehicle comprising a plurality of wheels, in particular during a hill descent, comprising:
    a device for determining an actual speed signal;
    a device for determining an inclination signal that represents a rate of change of an inclination as a function of time of a motor vehicle in a travelling direction thereof during a hill descent;
    a device for determining a setpoint speed signal;
    a device for determining a difference signal from the actual speed signal and the setpoint speed signal;

a device for determining an actuating signal from the difference signal, which device is coupled in such a way to the device for determining the inclination signal that the determination of the actuating signal from the difference signal may be influenced by the inclination signal; and a device for determining at least one braking signal from the actuating signal; and a brake system that can be coupled to the motor vehicle and acts upon at least one of the wheels thereof in response to said at least one braking signal.

* * * * *